United States Patent
Yajima et al.

(10) Patent No.: US 9,322,968 B2
(45) Date of Patent: Apr. 26, 2016

(54) POLARIZING LENS

(71) Applicant: HOYA CORPORATION, Shinjuku-ku, Tokyo (JP)

(72) Inventors: Eiichi Yajima, Tokyo (JP); Katsushi Hamakubo, Tokyo (JP); Kae Ito, Tokyo (JP)

(73) Assignee: HOYA CORPORATION, Tokyo (JP)

( * ) Notice: Subject to any disclaimer, the term of this patent is extended or adjusted under 35 U.S.C. 154(b) by 147 days.

(21) Appl. No.: 13/754,402

(22) Filed: Jan. 30, 2013

(65) Prior Publication Data

US 2013/0194664 A1   Aug. 1, 2013

(30) Foreign Application Priority Data

Jan. 31, 2012  (JP) ................. 2012-017641
Dec. 26, 2012  (JP) ................. 2012-282604

(51) Int. Cl.
  *G02B 1/10* (2015.01)
  *G02B 5/30* (2006.01)
  *G02C 7/12* (2006.01)

(52) U.S. Cl.
  CPC .............. *G02B 5/305* (2013.01); *G02B 5/3033* (2013.01); *G02C 7/12* (2013.01)

(58) Field of Classification Search
  CPC ................................ G02B 1/08; G02B 5/3041
  USPC ............. 359/485.03, 487.01, 487.02; 351/49; 264/1.32
  See application file for complete search history.

(56) References Cited

U.S. PATENT DOCUMENTS

| | | | |
|---|---|---|---|
| 2,400,877 A | 5/1946 | Dreyer | |
| 4,865,668 A | 9/1989 | Goepfert et al. | |
| 5,134,191 A * | 7/1992 | Takarada et al. | 524/783 |
| 7,625,626 B2 | 12/2009 | Bear et al. | |
| 7,922,847 B2 | 4/2011 | Bear et al. | |
| 2004/0096666 A1* | 5/2004 | Knox et al. | 428/412 |
| 2006/0146234 A1 | 7/2006 | Bear et al. | |
| 2007/0054131 A1 | 3/2007 | Stewart et al. | |
| 2009/0053516 A1 | 2/2009 | Davidovits et al. | |
| 2010/0028532 A1 | 2/2010 | Bear et al. | |
| 2010/0033675 A1 | 2/2010 | Miyoshi et al. | |
| 2011/0102892 A1 | 5/2011 | Yanagita | |
| 2011/0268874 A1* | 11/2011 | Yajima | 427/163.1 |

FOREIGN PATENT DOCUMENTS

| | | |
|---|---|---|
| CN | 101784924 A | 7/2010 |
| JP | 2-289801 A | 11/1990 |
| JP | 2002-527786 A | 8/2002 |
| JP | 2007-077327 A | 3/2007 |
| JP | 2008-527401 A | 7/2008 |
| JP | 2009-237361 A | 10/2009 |
| JP | 2011-170339 A | 9/2011 |
| WO | 2008/106034 A1 | 9/2008 |
| WO | 2009/029198 A1 | 3/2009 |

OTHER PUBLICATIONS

Extended European Search Report dated Apr. 19, 2013 issued in the corresponding European Patent Application No. 13153417.4.
Chinese Office Action issued in corresponding Chinese Patent Application No. 201310032851.X issued Feb. 2, 2016.

* cited by examiner

*Primary Examiner* — Joseph P Martinez
(74) *Attorney, Agent, or Firm* — Sughrue Mion, PLLC

(57) ABSTRACT

An aspect of the present invention relates to a polarizing lens, which comprises a polarizing layer comprising a dichroic dye and a functional film in this order on a lens substrate, and further comprises a waterborne resin layer between the polarizing layer and the functional film as a layer adjacent to both the polarizing layer and functional film, wherein the waterborne resin layer is greater than 0.50 μm in thickness and has been formed by coating and drying a waterborne resin composition comprising a polyether polyurethane resin and a water-based solvent.

3 Claims, No Drawings

POLARIZING LENS

CROSS-REFERENCE TO RELATED APPLICATIONS

This application claims the benefit of priority under 35 USC 119 to Japanese Patent Application No. 2012-17641 filed on Jan. 31, 2012 and Japanese Patent Application No. 2012-282604 filed on Dec. 26, 2012, which are expressly incorporated herein by reference in their entirety.

BACKGROUND OF THE INVENTION

1. Field of the Invention

The present invention relates to a polarizing lens, and more particularly, to a polarizing lens with good optical characteristics that is suitable as an eyeglass lens.

2. Discussion of the Background

Polarizing lenses are widely used as eyeglass lenses to reduce the glare experienced by the human eye in daily life, sports, and the like. Generally, the polarizing nature of dichroic dyes is utilized to reduce glare. These polarizing lenses are normally fabricated by forming a polarizing layer comprising a dichroic dye on a substrate on or an orientation layer positioned on a substrate. Methods for manufacturing such polarizing lenses are disclosed in, for example, published Japanese translation of PCT international publication for patent application (TOKUHYO) No. 2008-527401 or English language family members US2006/146234A1, U.S. Pat. No. 7,625,626, US2010/028532A1, and U.S. Pat. No. 7,922,847, Japanese Unexamined Patent Publication (KOKAI) No. 2009-237361 or English language family member US2011/102892A1, WO 2008/106034, and WO 2009/029198, which are expressly incorporated herein by reference in their entirety.

As is described in above publications, a functional film is normally provided on the polarizing layer to enhance durability, impart various functions, and the like in a polarizing lens.

However, when adhesion between the polarizing layer and the functional film is poor, the functional film will sometimes separate from the main body of the lens during storage or use. Accordingly, to increase the durability of a polarizing lens, a primer layer serving as an adhesive layer enhancing adhesion between the polarizing layer and the functional film is desirably provided. In this regard, waterborne resin compositions that contain little or almost no organic solvents have been proposed in recent years as adhesive layer-forming materials (the use of organic solvents has tended to be restricted from the perspective of their effect on the environment and on the human body). The present inventors considered the fact that many dichroic dyes were water soluble and that these waterborne resin compositions would thus lend themselves well to being coated on a polarizing layer containing a dichroic dye. When the present inventors employed a waterborne resin composition to form a primer layer positioned between a polarizing layer and a functional film, it was possible to enhance adhesion between the polarizing layer and the functional film. However, in some cases, cracking and clouding (haze) occurred and optical characteristics were found to deteriorate in the polarizing layer immediately following fabrication, or during storage or use, in the polarizing lenses that were fabricated. Accordingly, the present inventors conducted extensive research. They have previously proposed the use of a waterborne resin composition to form a primer layer (water-based primer layer) with a film thickness of equal to or less than 0.5 µm as a means of preventing the occurrence of cracking of the polarizing layer (Japanese Unexamined Patent Publication (KOKAI) No. 2011-170339, which is expressly incorporated herein by reference in its entirety).

The above means proposed by the present inventors is effective for preventing the occurrence of cracking of the polarizing layer in a polarizing lens having a water-based primer layer. However, a relatively high degree of film-forming technology is required to form a thin, uniform coating film. Thus, from the perspective of manufacturing suitability and productivity, it is also desirable to prevent the occurrence of cracking in the polarizing layer in polarizing lenses having a water-based primer layer with a film thickness exceeding 0.5 µm.

SUMMARY OF THE INVENTION

An aspect of the present invention provides for a polarizing lens with good optical characteristics having a water-based primer layer exceeding 0.5 µm in film thickness in which the occurrence of cracking of the polarizing layer is inhibited.

The present inventors conducted extensive research in this regard. As a result, they discovered for the first time ever that the occurrence of cracking in the polarizing layer could be prevented even when the film thickness of the primer layer exceeded 0.50 µm by forming a primer layer of a waterborne resin composition comprising a polyether polyurethane resin as a resin component. Although the reason for this is unclear, the present inventors presume that the polyether moieties contained in the polyether polyurethane resin play some role.

The present invention was devised based on the above discovery.

An aspect of the present invention relates to a polarizing lens, which comprises:

a polarizing layer comprising a dichroic dye and a functional film in this order on a lens substrate, and further comprises a waterborne resin layer between the polarizing layer and the functional film as a layer adjacent to both the polarizing layer and functional film, wherein the waterborne resin layer is greater than 0.50 µm in thickness and has been formed by coating and drying a waterborne resin composition comprising a polyether polyurethane resin and a water-based solvent.

In an embodiment, the functional film is a cured film formed by subjecting a curable composition to a curing treatment.

In an embodiment, the curable composition is a photocurable composition or a heat-curable composition.

In an embodiment, the thickness of the waterborne resin layer is greater than 0.50 µm and equal to or less than 2.0 µm.

The present invention makes it possible to provide a polarizing lens having good optical characteristics that is suitable as an eyeglass lens.

Other exemplary embodiments and advantages of the present invention may be ascertained by reviewing the present disclosure.

DETAILED DESCRIPTION OF THE EMBODIMENTS

Unless otherwise stated, a reference to a compound or component includes the compound or component by itself, as well as in combination with other compounds or components, such as mixtures of compounds.

As used herein, the singular forms "a," "an," and "the" include the plural reference unless the context clearly dictates otherwise.

Except where otherwise indicated, all numbers expressing quantities of ingredients, reaction conditions, and so forth used in the specification and claims are to be understood as being modified in all instances by the term "about." Accordingly, unless indicated to the contrary, the numerical parameters set forth in the following specification and attached claims are approximations that may vary depending upon the desired properties sought to be obtained by the present invention. At the very least, and not to be considered as an attempt to limit the application of the doctrine of equivalents to the scope of the claims, each numerical parameter should be construed in light of the number of significant digits and ordinary rounding conventions.

Additionally, the recitation of numerical ranges within this specification is considered to be a disclosure of all numerical values and ranges within that range. For example, if a range is from about 1 to about 50, it is deemed to include, for example, 1, 7, 34, 46.1, 23.7, or any other value or range within the range.

The following preferred specific embodiments are, therefore, to be construed as merely illustrative, and non-limiting to the remainder of the disclosure in any way whatsoever. In this regard, no attempt is made to show structural details of the present invention in more detail than is necessary for fundamental understanding of the present invention; the description making apparent to those skilled in the art how several forms of the present invention may be embodied in practice.

An aspect of the present invention relates to a polarizing lens, which comprises:

a polarizing layer comprising a dichroic dye and a functional film in this order on a lens substrate, and further comprises a waterborne resin layer between the polarizing layer and the functional film as a layer adjacent to both the polarizing layer and functional film, wherein the waterborne resin layer is greater than 0.50 µm in thickness and has been formed by coating and drying a waterborne resin composition comprising a polyether polyurethane resin and a water-based solvent.

By preventing the occurrence of cracking in the polarizing layer, the polarizing lens of an aspect of the present invention can exhibit good optical characteristics.

The polarizing lens of an aspect of the present invention will be described in greater detail below.

Lens Substrate

As the lens substrate, those made of materials that are commonly employed in the lens substrates of eyeglass lenses, such as lens substrates comprised of plastics such as polyurethane, polythiourethane, polycarbonate, and diethylene glycol bis(allyl carbonate), and inorganic glasses, can be employed. Neither the thickness nor the diameter of the lens substrate is specifically limited. The thickness is normally about 1 to 30 mm and the diameter normally about 50 to 100 mm. When the polarizing lens is an eyeglass lens employed to correct vision, a lens substrate with a refractive index nd of about 1.5 to 1.8 is normally employed. A lens substrate that is colorless is normally employed, but a lens substrate with coloration of a degree that does not compromise transparency can be employed. The surface shape of the substrate on which the polarizing layer is formed is not specifically limited. The shape can be flat, convex, concave, or the like as desired.

Orientation Layer

The polarizing property of the dichroic dye comprised in the polarizing layer is primarily achieved by monoaxially orienting the dichroic dye. To monoaxially orient the dichroic dye, the method of coating a coating liquid comprising the dichroic dye on a grooved surface is generally adopted, and can be used in an aspect of the present invention. The grooves for monoaxially orienting the dichroic dye can be formed on the surface of the substrate. However, as described in the above publications, forming the grooves on the surface of an orientation layer provided on the lens substrate is advantageous in terms of achieving a good polarizing property from the dichroic dye.

The orientation layer is normally provided either directly on the lens substrate of indirectly through another layer. A hardcoat layer is an example of a layer that can be formed between the lens substrate and the orientation layer. The hardcoat layer is not specifically limited. A coating of microparticulate metal oxide added to an organic silicon compound is desirable. By way of example, for details on such hardcoat layers, reference can be made to Japanese Unexamined Patent Publication (KOKAI) No. 2007-77327, paragraphs [0071] to [0074], and Japanese Unexamined Patent Publication (KOKAI) No. 2009-237361, paragraph [0027]. The contents of the above publications are expressly incorporated herein by reference in their entirety. Instead of an organic silicon compound, an acrylic compound can be employed to form the hardcoat layer. Known UV-curable resins such as acrylate monomers and oligomers, as well as EB-curable resins can be employed as coating compositions to form the hardcoat layer. Such hardcoat layers will be described further below. The thickness of the hardcoat layer is about 0.5 to 10 µm, for example. Lens substrates with hardcoat layers are commercially available, and the orientation layer can be formed on such a lens substrate in an aspect of the present invention.

The thickness of the orientation layer is normally about 0.02 to 5 µm, desirably 0.05 to 0.5 µm. The orientation layer can be formed by depositing a film-forming material by a known film-forming method such as vapor deposition or sputtering, or by a known coating method such as dipping or spin coating. Examples of suitable film-forming materials are metals and semimetals, as well as oxides, complexes, and compounds thereof. Preferably, a material selected from among Si, Al, Zr, Ti, Ge, Sn, In, Zn, Sb, Ta, Nb, V, Y, and Cr; an oxide thereof; or a complex or compound thereof is employed. Of these, from the perspective of ease of imparting properties as an orientation layer, a silicon oxide such as SiO or $SiO_2$ is desirable. Of these, $SiO_2$ is preferred from the perspective of reactivity with silane coupling agents, described further below.

An example of an orientation layer formed by the coating method is a sol-gel film comprising an inorganic oxide sol. An example of a coating liquid that is suited to forming the sol-gel film is a coating liquid comprising an alkoxysilane or hexaalkoxydisiloxane and an inorganic oxide sol. From the perspective of ease of imparting functions as the orientation film, the alkoxysilane is desirably that denoted by general formula (1) described in Japanese Unexamined Patent Publication (KOKAI) No. 2009-237361, and the hexaalkoxydisiloxane is desirably that denoted by general formula (2) described in Japanese Unexamined Patent Publication (KOKAI) No. 2009-237361. The coating liquid can comprise either an alkoxysilane or a hexaalkoxydisiloxane, or both. Further, the alkoxysilane comprising a functional group denoted by general formula (3) described in Japanese Unexamined Patent Publication (KOKAI) No. 2009-237361 can also be incorporated as needed. For details regarding the above coating liquid and film-forming methods (coating methods), reference can be made to Japanese Unexamined Patent Publication (KOKAI) No. 2009-237361, paragraphs [0011] to [0023] and to [0031], and Examples described therein.

Grooves are normally formed on the orientation layer that has been formed to monoaxially orient the dichroic dye in the coating liquid that is coated on the orientation layer. Coating a coating liquid containing a dichroic dye on the surface of an orientation layer in which grooves have been formed can align the dye with the grooves or in a direction perpendicular to the grooves, depending on the properties of the dichroic dye. Thus, the dichroic dye can be monoaxially oriented and its polarizing properties can be well realized. The grooves can be formed by, for example, conducting the rubbing step that is conducted in the orientation processing of liquid-crystal molecules. A rubbing step is a step in which a surface being abraded is rubbed in a specific direction with cloth or the like. For details, reference can be made to U.S. Pat. No. 2,400,877 or 4,865,668, for example. The contents of the above publications are expressly incorporated herein by reference in their entirety. Grooves can also be formed on the orientation layer by the polishing treatment described in Japanese Unexamined Patent Publication (KOKAI) No. 2009-237361, paragraphs [0033] to [0034]. It suffices to set the depth and pitch of the grooves that are formed so as to monoaxially orient the dichroic dye.

Polarizing Layer (Dichroic Dye Layer)

The polarizing layer (dichroic dye layer) that is provided either directly or through an orienting layer or the like on the lens substrate will be described next.

"Dichroism" refers to a property whereby the color of light passing through differs based on the direction of propagation due to the anisotropy of selective light absorption of a medium. A dichroic dye has the properties of strongly absorbing light in a specific direction of the dye molecules relative to polarization light and weakly absorbing light in a direction perpendicular thereto. Some dichroic dyes are known to exhibit a liquid crystalline state within certain concentration and temperature ranges when water is employed as solvent. Such liquid crystals are referred to as lyotropic liquid crystals. This liquid crystalline state of dichroic dyes can be used to align the dye molecules in a specific direction, permitting stronger expression of dichroism. Coating a coating liquid comprising a dichroic dye on a surface in which grooves have been formed permits the monoaxial orientation of the dichroic dye, and thus the formation of a polarizing layer with a good polarizing property.

The dichroic dye employed in an aspect of the present invention is not specifically limited. Examples are the various dichroic dyes that are normally employed in polarizing members. Specific examples are: azo, anthraquinone, merocyanine, styryl, azomethine, quinone, quinophthalone, perylene, indigo, tetrazine, stilbene, and benzidine dyes. Those described in U.S. Pat. No. 2,400,877 and published Japanese translation of PCT international publication for patent application (TOKUHYO) No. 2002-527786 can also be employed. The contents of the above publications are expressly incorporated herein by reference in their entirety.

The coating liquid containing a dichroic dye can be in the form of a solution or a suspension. Many dichroic dyes are soluble in water. The coating liquid is usually an aqueous solution with water as solvent. The content of the dichroic dye in the coating liquid can be, for example, about 1 to 50 weight percent, but so long as the desired polarizing property is achieved, there is no limitation to this range.

The coating liquid can contain other components in addition to the dichroic dye. Dyes other than dichroic dyes are an example of other components. Formulating such dyes permits the manufacturing of a polarizing member of desired color. From the perspective of further enhancing coating properties and the like, a rheology-modifying agent, adhesion-promoting agent, plasticizer, leveling agent, and other additives can also be formulated.

The method of coating the coating liquid is not specifically limited. Examples are the above-mentioned known methods of dipping and spin coating. The thickness of the polarizing layer is not specifically limited, but is normally about 0.05 to 5 µm. The silane coupling agent, described further below, is normally used to impregnate the polarizing layer and essentially comprised by the polarizing layer.

When a water-soluble dye is employed as the dichroic dye, to enhance film stability, it is desirable to conduct a treatment to render the film insoluble in water after coating and drying the coating liquid. The water insolubilization treatment can be conducted by, for example, ion exchanging the terminal hydroxyl group of the dye molecule or creating a state of chelation between the dye and a metal ion. To that end, use of the method of impregnating the polarizing layer that has been formed with an aqueous solution of a metal salt is desirable. The metal salt that is employed is not specifically limited. Examples are $AlCl_3$, $BaCl_2$, $CdCl_2$, $ZnCl_2$, $FeCl_2$, and $SnCl_3$. Following the water insolubilization treatment, the surface of the polarizing layer can be dried.

To increase film stability and film strength, a dichroic dye immobilizing treatment can be conducted. The immobilizing treatment is preferably conducted following the insolubilization. By the immobilization treatment, the orientation state of the dichroic dye can be immobilized in the polarizing layer. The immobilizing treatment can be conducted with a coupling agent such as epoxy group-comprising silane coupling agents, amino group-comprising silane coupling agents, and the like. For details thereof, reference can be made to paragraphs [0032] to [0035] of Japanese Unexamined Patent Publication (KOKAI) No. 2011-170339, which is expressly incorporated herein by reference in its entirety.

Waterborne Resin Layer

In the polarizing lens of an aspect of the present invention, the primer layer that is provided between the polarizing layer and the functional film is a waterborne resin layer exceeding 0.50 µm in thickness that is formed of a waterborne resin composition comprising a polyether polyurethane resin and a water-based solvent. The waterborne resin layer is adjacent to both the polarizing layer and the functional film, thereby functioning as an adhesive layer increasing adhesion between the polarizing layer and the functional film. Here, by using a waterborne resin composition that contains a polyether polyurethane resin, it is possible to provide a polarizing lens in which the occurrence of cracking is prevented in the polarizing layer despite the presence of a thick primer layer exceeding 0.50 µm in film thickness. The ether moieties contained in the polyether polyurethane resin are thought to play some role therein. As an example of one presumed mechanism, the ether moieties contained in the polyether polyurethane resin are severed by the curing treatment during formation of the functional film, generating active groups. These active groups then form a highly crosslinked structure between the polyether polyurethane resin molecules, thereby increasing the coating strength of the primer layer so that it tends not to swell even when it absorbs moisture. In the present invention, the term "waterborne resin composition" refers to a composition having the property of solidifying when the water-based solvent it contains is removed. Here, the thickness of the primer layer that is faulted is equal to or greater than 0.50 µm, as set forth above, and is desirably equal to or greater than 0.60 µm. From the perspective of the optical characteristics of the polarizing lens that is obtained, the thickness of the primer layer is desirably equal to or less than 2.0 µm, preferably equal to or less than 1.0 μm. The film thickness of each of the various layers in the present invention can be determined by known film thickness measuring methods, or calculated from the film-forming conditions.

The water-based solvent contained in the waterborne resin composition is a solvent that contains at least water, such as water or a mixed solvent of water and a polar solvent or the like. From the perspective of liquid stability and film-forming properties, the concentration of the solid component of the waterborne resin composition is desirably 1 to 62 weight percent, preferably 5 to 38 weight percent. In addition to a resin component, the waterborne resin composition can be such that the polarizing layer contains, as needed, additives such as oxidation inhibitors, dispersing agents, plasticizers, leveling agents, and the like. A commercially available waterborne resin composition can be diluted with a solvent such as water, alcohol, propylene glycol monomethyl ether (PGM), or the like and suitable additives can be added for use.

The waterborne resin composition can comprise a polyether polyurethane resin in a dissolved state or in the form of dispersed microparticles (desirably colloidal particles) in the water-based solvent. Of these, a dispersion in the form of a polyether polyurethane resin dispersed as microparticles in a water-based solvent is desirable. In that case, from the perspective of the dispersion stability of the composition, the particle diameter of the polyether polyurethane resin is desirably equal to or less than 0.3 μm. The pH of the waterborne resin composition is desirably about 5.5 to 9.0 at 25° C. from the perspective of stability, and the viscosity at 25° C. is desirably 5 to 500 mPa·s, preferably 10 to 50 mPa·s, from the perspective of coating suitability.

The waterborne resin composition contains a resin component in the form of a polyether polyurethane resin, and may contain an additional resin component. In that case, the polyether polyurethane resin desirably accounts for the greatest proportion among the resin components (for example, equal to or greater than 80 weight percent). To more effectively prevent the generation of cracking in the polarizing layer, it is desirable to use a waterborne resin composition that contains only a polyether polyurethane resin as the resin component. The polyether polyurethane resin is a polyurethane that is obtained using as a polyol component only a polyether polyol. In a polyurethane obtained employing a polyol having some other structure along with a polyether polyol as polyol components, such as polyurethane obtained using a polyester polyol in addition to a polyether polyol as the polyol component (polyether polyester polyurethane), the effect of the bonds (such as ester bonds) contained in the polyol of another structure makes it difficult to adequately prevent the occurrence of cracking of the polarizing layer positioned beneath the waterborne resin layer exceeding 0.50 μm in thickness. Accordingly, as set forth above, the polyether polyurethane resin in an aspect of the present invention is a polyurethane obtained using just polyether polyol as the polyol component.

Polyether polyurethane resin can be prepared by subjecting a polyether polyol and an organic polyisocyanate to a urethane reaction together with a chain-extending agent, as needed, in solvent with great affinity to water, which is inert to the reaction, to obtain a prepolymer, neutralizing the prepolymer, and then dispersing it in a water-based solvent containing a chain-extending agent to increase the molecular weight. In particular, a waterborne resin composition obtained by dispersing in a water-based solvent a prepolymer with a terminal isocyanate having an anionic group such as a carboxyl group or sulfonate group and having a basic structure in the form of a polyether polyol is desirable. Methods of preparing such waterborne resin compositions are known. A commercially available water-based urethane can be employed as is, or diluted with a water-based solvent as needed for use as the waterborne resin composition in an aspect of the present invention.

A waterborne resin layer can be formed as a primer layer on the polarizing layer by coating and drying the above-described waterborne resin composition on the surface of the polarizing layer. The primer layer can be formed by a known coating method such as dipping or spin coating. It suffices to suitably set the coating conditions in a manner permitting the formation of a primer layer of desired film thickness. Prior to applying the coating, it is possible to subject the surface of the polarizing layer, which is the layer to be coated, to a chemical treatment with an acid, alkali, or any of various organic solvents or the like; a physical treatment with plasma, UV radiation, ozone or the like; or a detergent treatment with any of various detergents. The above drying can be conducted by placing the lens on which the waterborne resin composition has been coated in an atmosphere of from room temperature to 100° C. for from 5 minutes to 24 hours, for example.

Functional Film

The functional film that is directly formed on the waterborne resin layer is not specifically limited other than that it imparts the desired properties to the polarizing lens. The functional film can be formed by coating a curable composition on the surface of the waterborne resin layer and then subjecting it to a curing treatment. As set forth above, the curing treatment that is conducted here is thought to cause the polyether polyurethane resin in the waterborne resin layer to generate active groups that then contribute to preventing the occurrence of cracking in the polarizing layer. The type of cured coating that is formed can be determined based on the performance required of the polarizing lens. A desirable specific example is a hardcoat layer that contributes to enhancing the scratching resistance and the like of the polarizing lens. From the perspectives of achieving both enhanced lens durability and optical characteristics, the thickness thereof desirably falls within a range of 5 to 10 μm. A coating of microparticulate metal oxide added to the organic silicon compound as described above can be formed as a hardcoat layer. The coating is normally cured by a heat treatment. The heat curing treatment can be conducted by, for example, placing a lens that has been coated with a coating liquid containing an organic silicon compound and a microparticulate metal oxide in an environment with an ambient temperature of 50 to 150° C. for about 30 minutes to 2 hours.

From the perspective of workability, the hardcoat layer that is provided on the polarizing layer is advantageously formed from a photocurable compound. Thus, an example of a desirable hardcoat layer is one that comprises a main component in the form of a multifunctional acrylate compound. In the present invention, the term "acrylate" includes methacrylate. Below, the term "(meth)acrylate" encompasses both acrylate and methacrylate. Generally, an acrylic coating adheres poorly to the polarizing layer. In contrast, the above waterborne resin layer can be provided between the two films to enhance adhesion.

A multifunctional acrylate compound that can be used to form the hardcoat layer is a compound having at least two intramolecular acrylate polymerizable groups, desirably a compound having at least two intramolecular acryloyloxy or methacryloyloxy groups. Specific examples are those described in paragraph [0048] of Japanese Unexamined Patent Publication (KOKAI) No. 2011-170339. For details of the acrylic hardcoat layer, reference can be made to paragraphs [0049] to [0053] of Japanese Unexamined Patent Publication (KOKAI) No. 2011-170339. The light that is irradiated can be, for example, an electron beam or ultraviolet radiation. The type of light irradiated and the irradiation conditions are suitably selected based on the type of hardcoat layer-forming components being employed. Generally, it is possible to form a high-strength hardcoat layer that contributes to enhancing the scratching resistance of the lens by irradiating ultraviolet radiation with an irradiation intensity of about 500 to 2,000 mJ/cm$^2$.

A polarizing lens sequentially having on a lens substrate a polarizing layer, a waterborne resin layer, and a functional film can be obtained by the above-described steps. In the polarizing lens of an aspect of the present invention, as the above functional film, or on the above functional film, functional films such as antireflective films, water-repellent films, UV-absorbing films, IR-absorbing films, photochromic films, and antistatic films can be laminated by known methods.

EXAMPLES

The present invention will be described in detail below based on Examples. However, the present invention is not limited to the examples. The room temperature referred to below is 25° C.±5° C.

Example 1

Fabricating a Polarizing Lens (1) Forming the Orientation Layer

A Phoenix lens (made by Hoya Corp., refractive index 1.53, with hardcoat, 70 mm in diameter, base curve 4, center thickness 1.5 mm) was employed as the lens substrate. A $SiO_2$ film 0.2 μm in thickness was formed by vacuum vapor deposition on the concave surface of the lens.

Abrasive-containing urethane foam (abrasive: Polipla203A, product made by Fujimi Inc., $Al_2O_3$ particles with an average particle diameter 0.8 μm; urethane foam: roughly identical in shape to the curvature of the concave surface of the above lens) was employed to apply a monoaxial polishing treatment for 30 seconds under conditions of a rotational speed of 350 rpm and a polishing force of 50 g/cm$^2$ to the $SiO_2$ film that had been formed. The polished lens was rinsed in pure water and dried.

(2) Forming the Polarizing Layer

After drying the lens, 2 to 3 g of an aqueous solution comprising about 5 weight percent of water-soluble dichroic dye (Varilight Solution 2S, a product made by Sterling Optics, Inc.) was spin coated onto the polished surface to form a polarizing layer. The spin coating was conducted by feeding the aqueous solution of dye at a rotational speed of 300 rpm maintained for 8 seconds, followed by a rotational speed of 400 rpm maintained for 45 seconds, and 1,000 rpm maintained for 12 seconds.

Next, an aqueous solution was prepared with an iron chloride concentration of 0.15 M, a calcium hydroxide concentration of 0.2 M, and a pH of 3.5. The lens obtained as set forth above was immersed for about 30 seconds in this aqueous solution and then withdrawn and thoroughly rinsed with pure water. This process rendered the previously water-soluble dye sparingly soluble (insolubilization treatment).

(3) Solidifying Treatment

Following (2) above, the lens was immersed for 15 minutes in a 10 weight percent aqueous solution of γ-aminopropyltriethoxysilane. Subsequently, it was rinsed three times with pure water, heat treated for 30 minutes in a heating furnace (temperature within furnace: 85° C.), removed from the furnace, and cooled to room temperature.

Following cooling, the lens was immersed for 30 minutes in a 2 weight percent aqueous solution of γ-glycidoxypropyltrimethoxysilane. Subsequently, the lens was heat treated for 30 minutes in a heating furnace (temperature within furnace: 60° C.), removed from the furnace, and cooled to room temperature.

The thickness of the polarizing layer formed by the above process was about 1 μm.

(4) Forming the Waterborne Resin Layer

A waterborne polyurethane resin composition was spin coated on the surface of the polarizing layer following the above cooling. Adeka Bontiter HUX-350, a product made by Adeka Corp. (resin component: polyether polyurethane) that had been diluted six-fold with propylene glycol monomethyl ether (PGM) and to which a leveling agent (FZ-2105, a product made by Dow Corning Toray) had been added, was employed as the waterborne polyurethane resin composition.

Following the spin coating, the lens was dried at room temperature and a primer layer was formed on the polarizing layer. The thickness of the primer layer formed as calculated based on the film-forming conditions was 0.62 μm.

(5) Forming the Hardcoat Layer

The lens that had been subjected to the processing of (4) above was spin coated (1,000 rpm maintained for 30 seconds) with a coating liquid in the form of a mixture of 1,000 weight parts of dipentaerythritol hexaacrylate (Kayarad DPHA, made by Nippon Kayaku Co., Ltd.), 3,000 weight parts of ethyl acetate, and 30 weight parts of photopolymerization initiator (Irgacure 819, made by Ciba Japan). Following the coating, curing was conducted at a UV irradiation intensity of 1,200 mJ/cm$^2$ with a UV irradiation device to obtain a hardcoat layer with a thickness of 4.5 μm.

A polarizing lens having on a lens substrate an orientation layer, a polarizing layer, a waterborne resin layer, and a hardcoat layer was prepared by the above process.

Example 2

A polarizing lens was obtained by the same method as in Example 1 with the exceptions that Adeka Bontiter HUX-550, a product made by Adeka Corp. (resin component: polyether polyurethane resin) that had been diluted six-fold with propylene glycol monomethyl ether (PGM), was employed as the waterborne polyurethane resin composition for forming the waterborne resin layer and the spin coating conditions were adjusted to form a waterborne resin layer 0.90 μm in thickness.

Example 3

A polarizing lens was obtained by the same method as in Example 1 with the exceptions that the heat treatment in the amino silane treatment and the heat treatment in the epoxy silane treatment were changed to natural drying at room temperature and the hardcoat layer was formed by the following method.

Seventeen weight parts of γ-glycidoxypropyltrimethoxysilane, 30 weight parts of methanol, and 28 weight parts of colloidal silica dispersed in water (solid component 40 weight percent, average particle diameter 15 nm) were charged to a vessel made of glass equipped with a magnetic stirrer and thoroughly mixed. Stirring was conducted for 24 hours at 5° C. Next, 15 weight parts of propylene glycol monomethyl ether, 0.05 weight part of silicone surfactant, and 1.5 weight parts of a curing agent in the form of aluminum acetyl acetonate were added, and the mixture was thoroughly stirred and filtered to prepare a hard coating liquid (hard coating composition). The pH of the coating liquid was 5.5.

The hard coating composition that had been prepared was coated by dipping (withdrawal rate of 20 cm/minute) on the surface of the waterborne resin layer. Subsequently, curing was conducted by heating for 90 minutes in a heating furnace at temperature within the furnace of 100° C. to form a hard-coat layer 3 μm in thickness.

Comparative Example 1

A polarizing lens was obtained by the same method as in Example 1 with the exceptions that, as the waterborne polyurethane resin composition for forming the waterborne resin layer, a coating liquid of Adeka Bontiter HUX-232, a product made by Adeka Corp. (resin component: polyester polyurethane resin) that had been diluted six-fold with propylene glycol monomethyl ether (PGM) was spin coated on the surface of the polarizing layer, and the lens was dried by placing it for 30 minutes in a furnace (temperature within furnace: 60° C.) to form a waterborne resin layer 1.24 μm in thickness. The thickness of the waterborne resin layer was adjusted by means of the spin-coating conditions.

Comparative Example 2

A polarizing lens was obtained by the same method as in Comparative Example 1 with the exception that the spin-coating conditions were adjusted to form a waterborne resin layer 0.58 μm in thickness.

Reference Example 1

A polarizing lens was obtained by the same method as in Comparative Example 1 with the exception that the spin-coating conditions were adjusted to form a waterborne resin layer 0.30 μm in thickness.

Evaluation Methods (1) Presence or Absence of Clouding Immediately Following Fabrication The haze value immediately following fabrication of each of the polarizing lenses of the above Examples, comparative examples, and reference example was measured with an HM-150 haze meter made by Murakami Color Research Laboratory Co., Ltd., and the presence or absence of clouding (haze) was evaluated according to the following scale:
(Evaluation Scale)
A: No clouding (haze value ≤1.0%)
B: Clouding present (haze value >1.0%)
(2) Presence or Absence of Clouding after Moisture Resistance Test The presence or absence of clouding of the polarizing lenses following storage for 168 hours in an environment with a temperature of 40° C. and a relative humidity of 90% RH was evaluated by the above method for the various polarizing lenses of the Examples, comparative examples, and reference example.

The results are given in Table 1.

TABLE 1

| | Resin component in waterborne resin layer | Film thickness of waterborne resin layer | Presence or absence of clouding immediately following fabrication | Presence or absence of clouding after moisture resistance test |
| --- | --- | --- | --- | --- |
| Example 1 | Polyether polyurethane | 0.62 μm | A | A |
| Example 2 | Polyether polyurethane | 0.90 μm | A | A |
| Example 3 | Polyether polyurethane | 0.62 μm | A | A |
| Comp. Ex. 1 | Polyester polyurethane | 1.24 μm | B | B |
| Comp. Ex. 2 | Polyester polyurethane | 0.58 μm | A | B |
| Ref. Ex. 1 | Polyester polyurethane | 0.30 μm | A | A |

A comparison of Comparative Examples 1 and 2 and Reference Example 1 in Table 1 reveals that in the polarizing lenses having a waterborne resin layer containing polyester polyurethane resin as the resin component, it was impossible to prevent clouding without thinning the waterborne resin layer. Observation by scanning electron microscopy (SEM) (applied voltage: 10 kV; magnification: 5,000-fold) of the state of the cross sections of the polarizing lenses of Comparative Examples 1 and 2, which exhibited clouding, revealed that cracking had occurred in the portion of the polarizing layer on the waterborne resin side. That confirmed that in polarizing lenses having a waterborne resin layer containing a resin component in the form of polyester polyurethane, the transparency decreased (haze occurred) due to cracking of the polarizing layer when the thickness of the waterborne resin layer exceeded 0.5 μm.

Separately from the above, with the exceptions that each of:
Adeka Bontiter HUX-210, a product made by Adeka Corp. (resin component: polyester polyurethane resin);
Adeka Bontiter HUX-320, a product made by Adeka Corp. (resin component: polyether polyester polyurethane resin);
Adeka Bontiter HUX-386, a product made by Adeka Corp. (resin component: polycarbonate polyurethane resin); and
Adeka Bontiter HUX-541, a product made by Adeka Corp. (resin component: polyester polyurethane resin)
was diluted six-fold with propylene glycol monomethyl ether (PGM) and used as a water-based polyurethane resin composition to form a waterborne resin layer about 0.6 μm in thickness, polarizing lenses were obtained by the same method as in Example 1 and evaluated in the manner set forth above. As a result, each exhibited clouding (haze value >1.0%) either immediately following fabrication or following the moisture resistance test.

By contrast, as shown in Table 1, Examples 1 to 3 did not exhibit clouding, either immediately following fabrication or after the moisture resistance test, despite a waterborne resin layer exceeding 0.50 μm in thickness. Based on these results, a waterborne resin layer containing a resin component in the form of polyether polyurethane was found to yield a high-quality polarizing lens in which cracking did not develop in the polarizing layer even at a thickness exceeding 0.50 μm.

The present invention is useful in the field of manufacturing eyeglass lenses.

Although the present invention has been described in considerable detail with regard to certain versions thereof, other versions are possible, and alterations, permutations and equivalents of the version shown will become apparent to those skilled in the art upon a reading of the specification and study of the drawings. Also, the various features of the versions herein can be combined in various ways to provide additional versions of the present invention. Furthermore, certain terminology has been used for the purposes of descriptive clarity, and not to limit the present invention. Therefore, any appended claims should not be limited to the description of the preferred versions contained herein and should include all such alterations, permutations, and equivalents as fall within the true spirit and scope of the present invention.

Having now fully described this invention, it will be understood to those of ordinary skill in the art that the methods of the present invention can be carried out with a wide and equivalent range of conditions, formulations, and other parameters without departing from the scope of the invention or any Examples thereof.

All patents and publications cited herein are hereby fully incorporated by reference in their entirety. The citation of any publication is for its disclosure prior to the filing date and should not be construed as an admission that such publication is prior art or that the present invention is not entitled to antedate such publication by virtue of prior invention.

What is claimed is:

1. A polarizing lens, which comprises:
a polarizing layer comprising a dichroic dye and a functional film in this order on a lens substrate,
and further comprises a waterborne resin layer between the polarizing layer and the functional film as a layer adjacent to both the polarizing layer and functional film, wherein
the waterborne resin layer is greater than 0.50 μm and equal to or less than 2.0 μm in thickness and has been formed by coating and drying a waterborne resin composition comprising a polyether polyurethane resin and a water-based solvent.

2. The polarizing lens according to claim 1, wherein the functional film is a cured film formed by subjecting a curable composition to a curing treatment.

3. The polarizing lens according to claim 2, wherein the curable composition is a photocurable composition or a heat-curable composition.

* * * * *